United States Patent [19]
Hachisuka et al.

[11] Patent Number: 5,910,357
[45] Date of Patent: Jun. 8, 1999

[54] SEPARATION MEMBRANE AND METHOD OF PRODUCING THE SAME, AND SHAPE MEMORY POLYMER COMPOSITION

[75] Inventors: Hisao Hachisuka; Yoshihiko Kondo; Kenichi Ikeda; Hitoshi Takano; Amane Mochizuki, all of Osaka, Japan

[73] Assignee: Nitto Denko Corporation, Ibaraki, Japan

[21] Appl. No.: 08/889,761

[22] Filed: Jul. 10, 1997

[30] Foreign Application Priority Data

Jul. 12, 1996 [JP] Japan ................................. 8-183868
Oct. 28, 1996 [JP] Japan ................................. 8-285453

[51] Int. Cl.⁶ ........................ B01D 39/00; B01D 39/14
[52] U.S. Cl. ................. 428/315.5; 210/500.21; 210/500.41
[58] Field of Search ............... 210/500.21, 500.41, 210/500.34, 500.35, 500.36, 500.42; 428/316.6, 315.5, 315.9

[56] References Cited

U.S. PATENT DOCUMENTS

| | | |
|---|---|---|
| 3,086,242 | 4/1963 | Cook et al. . |
| 3,139,468 | 6/1964 | Wheat . |
| 4,719,277 | 1/1988 | Behnke et al. ............... 210/500.21 X |
| 4,721,732 | 1/1988 | Dubrow et al. ............... 210/500.21 X |
| 4,877,661 | 10/1989 | House et al. . |
| 4,968,733 | 11/1990 | Müller et al. ............... 210/500.21 X |
| 5,266,391 | 11/1993 | Donato et al. ............... 210/500.41 X |
| 5,354,587 | 10/1994 | Abayasekara ............... 210/500.21 X |
| 5,431,817 | 7/1995 | Braatz et al. ............... 210/500.41 X |
| 5,531,893 | 7/1996 | Hu et al. ............... 210/500.41 X |

FOREIGN PATENT DOCUMENTS

| | | |
|---|---|---|
| 59-53528 | 3/1984 | Japan . |
| 61-16956 | 1/1986 | Japan . |

*Primary Examiner*—Daniel Zirker
*Attorney, Agent, or Firm*—Merchant, Gould, Smith, Edell, Welter & Schmidt P.A.

[57] ABSTRACT

A separation membrane and a method of producing the membrane are provided. The membrane can control its permselectivity and its fouled pores can be easily washed by using the reversible shape change of the membrane. For this purpose, porous shape memory polymers are used for the separation membrane.

22 Claims, No Drawings

SEPARATION MEMBRANE AND METHOD OF PRODUCING THE SAME, AND SHAPE MEMORY POLYMER COMPOSITION

FIELD OF THE INVENTION

This invention relates to separation membranes comprising shape memory polymers and methods of producing the same. More specifically, this invention relates to separation membranes used for separation-purification of gasses, liquids and vapors or used for removal of particles, suspensoids such as impurities, colloidal protein and polymers. Such separation membranes also are used as battery membrane separators.

BACKGROUND OF THE INVENTION

Various methods for producing shape memory polymers are known. For instance, the shape of a polymer material can be changed reversibly and isothermally by controlling its pH, by chelation, or by using chemical energy generated by a redox reaction. The shape of the polymer material can be changed reversibly and isothermally by using photoreaction of the photosensitive groups; heat is also used for this purpose. Several kinds of polymers having a heat-sensitive shape memory property have been known. These polymers can be classified by their structure into polymer crosslinked substances having the proper melting point or glass transition temperature (above a room temperature) or cold-worked materials of polymer crosslinked substances having the proper melting point or glass transition temperature and a remarkably high molecular weight. In typical polymer materials within the temperature range below the glass transition temperature or the melting point, thermal motion of the molecular chains is restricted so that the polymer becomes hard. Once this polymer is heated to exceed the glass transition temperature or the melting point, it becomes a rubber-like substance. Such a temperature dependence is common among polymer materials. In view of practical use, there are problems in the temperature region of the glass transition temperature or melting point, and the level of deformation.

Almost all polymers, however, have shape memory properties if they have substantial crosslinking temperatures to the extent that strains are not relieved. A kind of polymer resin produced by any suitable production method is subjected to a crosslinking reaction in order to memorize its shape after molding. The mold is heated to a temperature above its glass transition temperature or melting point, and the resin is deformed and cooled below its glass transition temperature or melting point while keeping its deformed state so that the strains will be maintained. The thermal motion of the molecular chain is restricted and its strain is fixed at or under the class transition temperature or the melting point. When this deformed mold is again heated to be at least glass transition temperature or melting point where the molecular chains can do thermal motion, the strain is relaxed and the original shape is obtained. Such well-known shape memory polymers include crystalline polyolefin crosslinked substances (U.S. Pat. No. 3,086,242), crystalline trans-isoprene crosslinked substances (Japanese Patent Application No. 61-16956) and crystalline trans-polybutadiene crosslinked substances (U.S. Pat. No. 3,139,468). Among the polyolefins, crystalline polyethylene crosslinked substances are used for heat-contracting tubes. In these crystalline polymers, however, crystallization is not obstructed by crosslinking. As a result, special operations are required to provide shape memory properties, for instance, crosslinking is provided by low temperature vulcanization or irradiation on to the crystallized polymers. When the molecular weight of the polymers is remarkably high, the shape memory property can be found since the intertwining polymer chains substantially define crosslinking temperatures and thus, the strain is not relaxed even if the temperature is at or below the glass transition temperature. Well-known examples of such shape memory polymers include polynorbornene (JPA No. 59-53528), poly (vinylchloride), poly(methyl methacrylate), polycarbonate, and acrylonitrile-butadiene (AB) resin. These shape memory polymers are used for mechanical devices, heat-sensitive tubes and portions that should recover the original shapes after absorbing shock. Examples of articles using such materials are toys, deformed pipe jointing materials, laminate materials inside pipes, lining materials, clamp pins, medical instruments, teaching materials, artificial flowers and car bumpers, mechanical devices and heat-contracting tubes. Although separation membranes using such shape memory polymers have been disclosed (JPA 2-645), a reversible property of the shape memory polymers has not been applied for a separation membrane. Therefore, such membranes are not practically used.

For a separation membrane, optional bore size control, namely, designing a porous membrane having several separation properties is difficult when the conventional polymer materials and the membrane forming technique are used. In addition, the conventional separation membranes, especially porous membranes, have another problem: the permeability will deteriorate because of fouling. In order to solve such problems, back wash has been carried out. Back wash is a technique to apply pressure from the permeation side (the direction opposite to normal pressurizing direction) to remove fouling substances. In this back wash technique, however, the pressure for the treatment must not be set high in order to avoid membrane damage, and thus, a sufficient wash-recovery effect cannot be obtained.

SUMMARY OF THE INVENTION

This invention aims to provide separation membranes and methods of producing the same that solve these and other problems of such conventional techniques. The separation membranes control their permselectivity by using the reversible shape change of the shape memory polymers. In addition, the fouls in the pores can be easily washed out by using the reversible shape change of the membranes.

In order to achieve the purposes, separation membranes of this invention comprise shape memory polymers and the membranes are porous. Here, a shape memory polymer is a polymer that can change its shape "A" into another shape "B" (plastic deformation), fixing its shape by cooling for example, and recovering its original shape "A" by heating the polymer again.

It is preferable in the separation membrane that the pore size of the shape memory polymer membrane is from $5.0 \times 10^{-4}$ μm to 15 μm.

It is preferable that the pore size of the shape memory polymer membrane will reversibly change in response to at least one factor selected from the group consisting of temperature, pressure, humidity, solvents, pH, photoreaction, electricity, chelation and redox reaction.

It is preferable that the pore size of the separation membrane comprising the shape memory polymer reversibly changes in response to at least either temperature or pressure.

It is preferable that the separation membrane comprising the shape memory polymer has at least one shape selected from the group consisting of hollow fiber, tubular, and flat sheet membrane.

It is preferable that the separation membrane comprising the shape memory polymer is combined with at least one kind of porous support.

It is preferable that the pore size of the porous support is at least 1.1 times of the pore size of the separation membrane.

It is preferable that the shape memory polymer is mixed with at least one other polymer.

It is preferable that the shape memory polymer is further mixed with at least one polymer soluble in the shape memory polymer.

It is preferable that the soluble polymer has at least one ether linkage in its repeating unit.

It is preferable that the shape memory polymer is selected from the group consisting of polynorbornene, styrene-butadiene copolymer, polyurethane, poly(vinyl chloride), poly(methyl methacrylate), polycarbonate, crystalline polyolefin crosslinked substances, crystalline trans-1,4-polyisoprene crosslinked substances, and crystalline trans-polybutadiene crosslinked substances.

It is preferable that the soluble polymer is polyethersulfone.

It is preferable that the shape memory polymer is polyurethane-based polymer.

It is preferable that the shape memory polymer is polyurethane-based polymer.

It is preferable that the shape memory polymer is polyurethane and the soluble polymer is polyethersulfone.

It is preferable that the shape memory polymer is blended in the range from 10 to 99 weight % and the soluble polymer is blended in the range from 1 to 90 weight %.

It is preferable that the separation membrane is a porous membrane and the pore size is from $5.0 \times 10^{-4}$ μm to 15 μm.

A first method of producing a separation membrane of this invention comprises the following steps:
  dissolving a polymer containing a shape memory polymer in an organic solvent (A) in order to prepare a dope solution;
  extruding the dope solution from at least one nozzle so that the solution has a hollow fiber shape, and/or coating the solution on a porous support; and
  dipping the hollow fibers or coating in a solvent (B) that does not dissolve the polymer containing the shape memory polymer but which is soluble in the organic solvent (A).

It is preferable in the method that the shape memory polymer is polyurethane; the organic solvent (A) is at least one solvent selected from the group consisting of N,N-dimethyl acetamide, N-methyl-2-pyrrolidone, N,N-dimethyl formamide, dimethyl sulfoxide, diethylene glycol dimethyl ether, diethylene glycol diethyl ether, diethylene glycol dibutyl ether, triethylene glycol diethyl ether, 1,2-diethoxymethane, 1,2-diethoxyethane, and 1,2-dibutoxyethane; and the solvent (B) is at least one solvent selected from either water or alcohols such as methanol, ethanol, and isopropyl alcohol.

It is preferable that the shape memory polymer is further mixed with at least one polymer that is soluble in the shape memory polymer.

It is preferable that the shape memory polymer is blended in the range from 10 to 99 weight % and the soluble polymer is blended in the range from 1 to 90 weight %.

In a second method of producing a separation membrane, a polymer containing a shape memory polymer is melted, and formed by extruding from at least one nozzle so that the polymer has at least one shape selected from the group consisting of hollow, tubular, and sheet shape.

In a third method of producing a separation membrane of this invention, a polymer containing a shape memory polymer is melted and formed by casting on a porous support.

The shape memory polymer composition of this invention comprises a mixture of a shape memory polymer and at least one polymer that is soluble in the shape memory polymer.

It is preferable in the composition that the polymer has at least one ether linkage in its repeating unit.

It is preferable that the polymer is polyethersulfone.

It is preferable that the shape memory polymer is polyurethane-based polymer.

It is preferable that the shape memory polymer is blended in the range from 10 to 99 weight % and the soluble polymer is blended in the range from 1 to 90 weight %.

In the separation membrane of this invention, the shape memory polymer reversibly changes the shape. The permselectivity of the membrane can be controlled by using the reversible change and also the fouling in the pores can be washed easily.

The shape memory polymer composition of this invention comprises a mixture of a shape memory polymer and at least one polymer soluble with the shape memory polymer. Therefore, the polymer composition used for separation membranes has excellent shape memory properties and mechanical strength.

The separation membrane of this invention uses the reversible shape change of the shape memory polymer. Therefore, the permselectivity is controllable and the fouling in the pores can be washed easily by using the reversible shape change of the membrane.

Furthermore in the method of this invention, separation membranes using the shape memory polymer can be produced effectively.

DETAILED DESCRIPTION OF THE INVENTION

This invention relates to separation membranes comprising shape memory polymers. The permselectivity of the membranes are controllable by using the shape changing properties of the shape memory polymers, and the membranes can be washed easily by using the reversible shape change if the pores are fouled and the membrane performance deteriorates.

The shape memory polymers used for the separation membranes of this invention are not limited if they reversibly change in response to at least one factor selected from the group consisting of temperature, pressure, humidity, solvents, pH, photoreaction, electricity, chelation, and redox reaction.

Concerning temperature, the shape memory polymers are not limited if they remain in the glass state of a room temperature and assume the rubber state at a temperature above the room temperature. It is preferable that the polymers mainly comprise, for instance, polynorbornene, styrene-butadiene copolymer, polyurethane, poly (vinylchloride), poly(methyl methacrylate), polycarbonate, crystalline polyolefin crosslinked substances, crystalline trans-1,4-polyisoprene crosslinked substances, and crystalline trans-polybutadiene crosslinked substances.

Concerning pressure, any rubber-like polymers can be used as long as they are rubber-like ones. The above polymers are preferably used.

Concerning humidity, the shape memory polymers are not limited as long as they memorize the shape by using changes due to humidity. Such polymers swell and contract, or they have the ability to convert between the glass state and the rubber state according to humidity. Preferable examples have three-dimensional crosslinked structure units, such as crosslinked polyvinyl alcohol and crosslinked polyamide.

Concerning solvents, the shape memory polymers are not limited as long as they memorize the shape by swelling, contracting or by the transition between the glass state and the rubber state. Preferably used are above-mentioned heat-sensitive shape memory polymers or three-dimensional crosslinked structure units such as crosslinked polyvinyl alcohol and crosslinked polyamide.

Concerning pH, the shape memory polymers are not limited as long as they have functional groups that dissociate due to pH change. The polymers reversibly change the membrane construction using pH. The change in membrane constitution occurs because of charged repulsion for dissociation or provided hydrophilicity. The shape is memorized by using the change like swelling, contraction, and transition between glass state and rubber state. Polymers having functional groups represented by the following formulas 1–5 are preferably used.

| | |
|---|---|
| $-SO_3^-$ | Formula 1 |
| $-COO^-$ | Formula 2 |
| $-P(O^-)_3=O$ | Formula 3 |
| $-C_6H_4-O^-$ | Formula 4 |
| $-NH_3^+$ | Formula 5 |

When polymers memorize their shapes according to photoreaction, they swell, contract, or convert between glass state and rubber state by using hydrophilicity and charged repulsion caused by photoreactive charge-separation or a structural change such as cis-trans transition. The functional groups will charge-separate by light beams having a wavelength in a specific region or will undergo a change in the structure (e.g. cis-trans transition). These functional groups are not limited as long as they are contained in polymer side chains and principal chains. It is preferable that functional groups such as spiropyran, azobenzene and pararosaniline are contained in polymer side chains and principal chains.

Any polymers can be used for producing membranes as long as they reversibly change in response to any factors such as electricity, chelation, and redox reaction.

These shape memory polymers can be used alone, or as a mixture or copolymer of at least two kinds of polymers. The shape memory polymers can be mixed or polymerized with at least one kind of polymer without shape memory property, such as polysulfone, polyimide, polyamide, and polyolefin, as long as the resulting mixture or copolymer has shape memory property. In a mixture or copolymer containing at least one kind of polymer having no shape memory property, shape memory polymers are contained preferably in an amount of at least 1 mol %, though the ratio is not specifically limited.

The shape memory resins and the other resins without shape memory are preferably soluble with each other in order to improve the membrane strength.

Though the shape memory polymers and soluble polymers are not limited, polymers having ether linkage in the principal chains and/or side chains are preferably used. These polymers include polyether imide, polyether ketone, polyether ether ketone, polyether sulfone, and polyether glycol.

The method of producing separation membranes using these polymers is explained below. The methods are not limited though the wet-phase transition method and the dry membrane-forming method are preferably used.

The following describes the membrane-forming steps in the wet-phase transition method.

A membrane-forming dope is prepared by dissolving the above materials in an organic solvent (A). The solution concentration is from 5–50 weight %, more preferably, 10–30 weight %. For the preparation, swelling agents, dispersing agents, and thickeners can be added if necessary. The organic solvent (A) is, for example, N,N-dimethyl acetamide, N-methyl-2-pyrrolidone, N,N-dimethyl formamide, dimethyl sulfoxide, diethylene glycol dimethyl ether, diethylene glycol diethyl ether, diethylene glycol dibutyl ether, triethylene glycol diethyl ether, 1,2-dimethoxyethane, 1,2-diethoxyethane, and 1,2-dibutoxyethane. These can be used alone, or as a mixture of at least two kinds of solvents. Asymmetric membranes that are tubular (including hollow fiber) or flat are obtained by extruding or casting the dope in order to dip the dope in a solvent (B) by extruding or casting. Otherwise the dope can be coated on a porous support by dipping or casting it, and dipping in the solvent (B) in order to obtain a composite membrane, so that the mechanical strength is improved.

The supports used in this invention include organic, inorganic or metal porous substrates with flat surface, woven clothes and unwoven clothes. The pore size of these porous support membranes preferably is at least 1.1 times greater than the pore size of the separation membranes in order to change the shape. The thickness of the dope coating on the porous support is 25–400 μm, preferably, 30–200 μm. The dope is coated on either one side or both sides of the porous support. The dope comprising the organic solvent (A) of this invention is formed into membranes at a temperature range from −80 to 80° C., preferably, 20 to 50° C.

The solvent (B) is a coagulation solution for dip-removing the organic solvent (A). The solvent (B) is not specifically limited if it does not dissolve the above-identified polymers while it is soluble in the above organic solvent (A). Water and alcohols such as methanol, ethanol, and isopropyl alcohol and the mixtures thereof are used, though water is preferably used. Though the temperature of the solvent (B) is not specifically limited for dipping in the solvent (B) to remove the organic solvent (A), it is preferably from 0 to 100° C.

The dry membrane-forming is carried out as follows.

The membranes are formed by melting the polymers and extruding the melted polymers from at least one nozzle so that the polymers become hollow fibers or flat sheet membranes. It is also preferable that the polymer is cast on a proper porous support. It is also preferable for controlling the pore size that the melted polymer is stretched in one or two directions during or after the membrane-forming steps. It is also preferable that additives are added for forming pores when the shape memory polymer is melted. Though such additives are not specifically limited, heat-resistant fluorine-base monomers and inorganic salts such as sodium chloride, calcium chloride, and calcium carbonate are preferably used. The quantity of the additives are 0.2 to 3 times to the weight of the polymer, or preferably, 0.5 to 1.5 times.

As mentioned above, the reversible change of the shape memory polymers is used in this invention so that the permselectivity is controllable and washing the pore to remove fouling can be conducted easily by using the reversible shape change of the membrane.

The following provides examples of this invention, though this invention is not limited thereby.

EXAMPLE 1

An 8 weight % dope solution was prepared by dissolving a polyurethane-based shape memory polymer ("Dialy" manufactured by Mitsubishi Heavy Industries Ltd.) in a solvent comprising N-methyl-2-pyrrolidone and N,N-dimethyl formamide at the ratio of 2:1. The prepared dope was coated on a glass plate by using an applicator at a gap of 200 $\mu$m, and dipped in hot water of 50° C., so that a flat porous membrane was obtained by the wet-phase transition method. The average pore size of this porous membrane was 2 $\mu$m, and the pure water flux was 550 [L/m$^2$ h] at 0.2 kgf/cm$^2$. The separation property and washing recovery property are shown in Table 1.

TABLE 1

Separation Property

| | |
|---|---|
| Kaolin 1,000 ppm [3 $\mu$m] | removed |
| Fe$_3$O$_4$ 1,000 ppm [3 $\mu$m] | removed |
| Colloidal Silica 20% [0.05 $\mu$m] | removed |
| Silicon Polishing Drainage 100 ppm [1 $\mu$m] | removed |
| Washing Recovery Note 1) | |
| Colloidal Silica | 100% |
| Fe$_3$O$_4$ | 91% |
| Silicon Polishing Drainage | 560% |
| Washing technique | hot water + back wash Note 2) |

Note 1)
Retention rate to the primary pure water flux
Note 2)
Back wash is conducted by supplying 60° C. hot water from the side where pure water is provided.
Back wash pressure: 0.02–0.03 kgf/cm$^2$
Back wash time: 30–300 sec.

The water-permeability of a membrane was decreased after the membrane was used for the purpose of assessment of the separation property. The membrane was back-washed (pressure: 0.5 kgf/cm$^2$) at 60° C. using the properties of the shape memory polymer. As a result, the original water-permeability was recovered, which indicates that the washability was good.

EXAMPLE 2

The dope described in Example 1 was coated on a woven cloth provided on a glass plate, and dipped in hot water (50° C.), so that a flat porous membrane was obtained by the wet-phase transition method. The woven fabric was E100H by OGIHARA MFG. CO. LTD, the weight was 52.5 g/m$^2$, the strength (length and width) was 51 kg/5 cm respectively, and ductility was 20% in length and 22% in width.

The pure water flux of this membrane was 300 L/m$^2$ h at 0.2 kgf/cm$^2$. The separation property was the same as that of Example 1. When this membrane was washed after colloidal silica assessment in the same manner as Example 1, the recovery rate was 100% to the primary pure water flux.

EXAMPLE 3

The polyurethane-based shape memory polymer described in Example 1 (Dialy: Mitsubishi Heavy Industries Ltd.) was mixed well with calcium chloride of equal weight at 170° C. in order to prepare a dope solution. This dope solution was supplied to the jacket of a double tubular nozzle (180° C.) at the extrusion pressure of 500 kgf/cm$^2$ and extruded to be a hollow fiber, while nitrogen was flowed into the center of the nozzle. The cooled hollow fiber was about 100 $\mu$m in outer diameter and about 90 $\mu$m in inner diameter. The hollow fiber was dipped in water to elute the calcium chloride so that a porous membrane was obtained. The pure water flux of this hollow membrane was 200 L/m$^2$ h·kgf/cm$^2$ at 25° C. The separation property was same as that of Example 1. When the membrane was washed after the assessment of colloidal silica in the same manner as Example 1, the recovery rate was 100% to the primary pure flux.

EXAMPLE 4

A 15 weight % dope solution was prepared by dissolving a polyurethane-based shape memory polymer (Dialy: Mitsubishi Heavy Industries Ltd.) in a solution comprising N-methyl-2-pyrrolidone and N,N-dimethyl formamide at the rate of 10:7. The obtained dope and pure water were extruded by using a double tubular nozzle 30 mm above a hot water bath (35° C.). In this step, the dope solution was supplied to the jacket of the nozzle while the pure water was supplied to the central part of the same nozzle, so that a hollow membrane of about 110 $\mu$m in outer diameter and about 100 $\mu$m in inner diameter was obtained. The pure water flux of this membrane was 460 L/m$^2$ h·kgf/cm$^2$ at 25° C. and the membrane surface observed using an electron microscope had pores of 0.3–0.5 $\mu$m diameter.

When this hollow-fiber membrane was stretched by using mechanical stress to a degree of 1.5–1.7 times, the pure water flux was about 600 L/m$^2$ h·kgf/cm$^2$ at 25° C. and the membrane surface observed using an electron microscope had pores of 0.5–0.8 $\mu$m diameter. When this stretched hollow fiber was dipped in hot water (60° C.), the pure water flux was 458 L/m$^2$ h·kgf/cm$^2$ at 25° C., and the surface observed with an electron microscope was substantially the same as an unstretched membrane.

EXAMPLE 5

A 15 weight % dope solution was prepared by dissolving a polyurethane-based shape memory polymer (Dialy: Mitsubishi Heavy Industries Ltd.) and polyethersulfone (article number: 300P) in an N-methyl-2-pyrrolidone solution. The weight ratio of the shape memory polymer to the polyethersulfone was 1:1. The prepared dope was coated on a glass plate by using an applicator at a gap of 200 $\mu$m, and removing the solvent at 100° C., so that a membrane was obtained. The membrane was transparent, which shows that a polymer alloy was obtained. The membrane maintains its stretched state by stretching in water of 60° C. to a degree of 1.5 times and then cooling. The membrane recovers the original shape by dipping in 60° C. water, namely, the membrane had shape memory property.

While the tensile strength of a membrane comprising 100 weight % of the shape memory polymer was 600 kgf/cm$^2$, the tensile strength of this membrane was as high as 900 kgf/cm$^2$, in other words, the mechanical strength of this polymer alloy membrane was 1.5 times that of the shape memory polymer alone.

COMPARATIVE EXAMPLE 1

The steps in this comparative example were same as those of Example 5 except that the polyethersulfone was replaced by polysulfone. The obtained membrane was turbid and the phases were separated. The membrane maintained the stretched state by cooling after stretching to be 1.5 times in 60° C. water. The membrane, however, did not recover its original shape after being dipped in 60° C. water, namely, this membrane did not have shape memory property.

EXAMPLE 6

A 15 weight % dope solution was prepared by dissolving a polyurethane-based shape memory polymer (Dialy: Mitsubishi Heavy Industries Ltd.) and polyethersulfone in an N-methyl-2-pyrrolidone solution. The weight ratio of the shape memory polymer to the polyethersulfone was 1:1. The prepared dope was coated on a glass plate by using an applicator at a gap of 200 μm, and dipped in hot water of 50° C., and thus a flat porous membrane was obtained by the wet-phase transition method. The pure water flux of the obtained membrane was 218 L/m²·h at 0.2 kgf/cm² at 25° C. The tensile strength of this membrane was twice that of the membrane shown in the following Example 7.

After a 20 weight % water solution of colloidal silica (average particle size: 0.05 μm) was passed for 30 minutes at a pressure of 0.2 kgf/cm², the membrane surface was washed with pure water, and its pure water flux was measured at the same pressure. The value of the flux was about one-third of the primary flux. This membrane was back-washed with hot water (60° C.) for 30 seconds at a pressure of from 0.02 to 0.03 kgf/cm². The membrane recovered its original state at the pressure of 0 kgf/cm² at 60° C., and the hot water was replaced with pure water (25° C.). When the pure water flux was again measured at the same condition, the flux was 217 L/m²·h, namely, the flux recovery rate was 100%.

EXAMPLE 7

A 15 weight % dope solution was prepared by dissolving a polyurethane-based shape memory polymer (Dialy: Mitsubishi Heavy Industries Ltd.) in an N-methyl-2-pyrrolidone solution. The prepared dope was coated on a glass plate by using an applicator at a gap of 200 μm, and dipped in hot water of 50° C., and thus a flat porous membrane was obtained by the wet-phase transition method. The pure water flux of the obtained membrane was 31.2 L/m²·h at 0.2 kgf/cm². The tensile strength of this membrane was 15 kgf/cm².

EXAMPLE 8

A dope solution was prepared by adding 21 weight % of polyethylene glycol having a molecular weight of 4000 in the polymer described in Example 6. The prepared dope was coated on a glass plate by using an applicator at a gap of 200 μm, and dipped in hot water of 50° C., and thus a flat porous membrane was obtained by the wet-phase transition method. The pure water flux of the obtained membrane was 122 L/m²·h at 0.2 kgf/cm².

A washing test was carried out in the same manner as Example 5. The flux after passing colloidal silica was half the primary value, and the membrane recovered substantially 100% of its flux after back washing.

As clearly shown in the Examples and Comparative Example, the permselectivity of the membrane can be controlled by using the reversible change of the shape memory polymers, and fouling in the pores can be washed in a simple manner by using the reversible change of the membrane.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A porous separation membrane comprising a porous shape memory polymer.
2. The separation membrane according to claim 1, wherein the pore size is from $5.0 \times 10^{-4}$ μm to 15 μm.
3. The separation membrane according to claim 1, wherein the pore size of the membrane comprising the shape memory polymer reversibly changes in response to at least one factor selected from the group consisting of temperature, pressure, humidity, solvent, pH, photoreaction, electricity, chelation, and redox reaction.
4. The separation membrane according to claim 1, wherein the membrane has a shape selected from the group consisting of hollow fiber, tubular and flat sheet membrane.
5. The separation membrane according to claim 1, wherein the shape memory polymer is supported by at least one porous support.
6. The separation membrane according to claim 5, wherein the pore size of the porous support is at least 1.1 times as that of the membrane.
7. The separation membrane according to claim 1, wherein the shape memory polymer is mixed with at least one other polymer.
8. The separation membrane according to claim 1, wherein the shape memory polymer is mixed with at least one polymer that is soluble in the shape memory polymer.
9. The separation membrane according to claim 8, wherein said soluble polymer has at least one ether linkage in its repeating unit.
10. The separation membrane according to claim 1, wherein the shape memory polymer is at least one polymer selected from the group consisting of polynorbornene, styrene-butadiene copolymer, polyurethane, poly(vinyl chloride), poly(methyl methacrylate), polycarbonate, crystalline polyolefin crosslinked substances, crystalline trans-1,4-polyisoprene crosslinked substances, and crystalline trans-polybutadiene crosslinked substances.
11. The separation membrane according to claim 8, wherein the soluble polymer is polyethersulfone.
12. The separation membrane according to claim 8, wherein the shape memory polymer is polyurethane-based polymer.
13. The separation membrane according to claim 8, wherein the shape memory polymer is polyurethane and the soluble polymer is polyethersulfone.
14. The separation membrane according to claim 8, wherein the shape memory polymer is blended in the range from 10 to 99 weight % and the soluble polymer is blended in the range from 1 to 90 weight %.
15. The separation membrane according to claim 8, wherein the separation membrane is a porous membrane and the pore size is from $5.0 \times 10^{-4}$ μm to 15 μm.
16. The separation membrane according to claim 15, wherein the pore size of the separation membrane reversibly changes in response to at least one factor selected from temperature and pressure.
17. The separation membrane according to claim 8, wherein the shape memory polymer separation membrane has a shape selected from the group consisting of flat, hollow and tubular shapes.
18. A shape memory polymer composition comprising a mixture of a shape memory polymer and at least one polymer that is soluble in the shape memory polymer.
19. The shape memory polymer composition according to claim 18, wherein the soluble polymer has at least one ether linkage in its repeating unlit.
20. The shape memory polymer composition according to claim 18, wherein the polymer is polyethersulfone.
21. The shape memory polymer composition according to claim 18, wherein the shape memory polymer is polyurethane-based polymer.
22. The shape memory polymer composition according to claim 18, wherein the shape memory polymer is blended in the range from 10 to 99 weight % and the soluble polymer is blended in the range from 1 to 90 weight %.

* * * * *